(12) United States Patent
Doan et al.

(10) Patent No.: US 7,948,663 B2
(45) Date of Patent: May 24, 2011

(54) DOCUMENT TRANSPORT

(75) Inventors: Long C. Doan, San Diego, CA (US);
Steven W. Hendrix, Jamul, CA (US);
Mark A. Overton, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 11/740,176

(22) Filed: Apr. 25, 2007

(65) Prior Publication Data

US 2008/0266614 A1 Oct. 30, 2008

(51) Int. Cl.
*H04N 1/04* (2006.01)
(52) U.S. Cl. .......... 358/474; 358/498; 358/496
(58) Field of Classification Search .......... 358/419, 358/474, 482, 496, 483, 494; 271/3.14, 3.01, 271/8.1; 399/71, 374, 367, 406, 365, 368, 379
See application file for complete search history.

(56) References Cited

U.S. PATENT DOCUMENTS

| | | | |
|---|---|---|---|
| 3,900,258 A * | 8/1975 | Hoppner et al. | 355/51 |
| 3,998,540 A * | 12/1976 | Weinstein | 399/200 |
| 4,005,257 A | 1/1977 | Krallinger et al. | |
| 4,970,606 A | 11/1990 | Shima | |
| 5,077,614 A | 12/1991 | Stemmle et al. | |
| 5,153,738 A | 10/1992 | Stemmle | |
| 5,319,419 A * | 6/1994 | Ishida et al. | 399/208 |
| 5,687,010 A * | 11/1997 | Van Tilborg et al. | 358/496 |
| 6,318,836 B1 * | 11/2001 | Hasegawa et al. | 347/33 |
| 7,551,331 B2 * | 6/2009 | Ishimaru et al. | 358/496 |

* cited by examiner

*Primary Examiner* — Jerome Grant, II

(57) ABSTRACT

A motor configured to selectively drive a carriage and document transport. A single imaging element is used to provide a dual function of detecting conveying sheet as it approaches platen and to perform imaging of the sheet.

21 Claims, 7 Drawing Sheets

DOCUMENT TRANSPORT

CROSS-REFERENCE TO RELATED PATENT APPLICATIONS

The present application is related to co-pending U.S. patent application Ser. No. 11/740,146 filed on the same day herewith by Steven W. Hendrix, Long C. Doan and Steven Batson and entitled MEDIA STACK STOP, the full disclosure which is hereby incorporated by reference.

BACKGROUND

Some devices include both a flatbed scanner and an automatic document feeder for scanning. Separate motors are provided for the flatbed scanner and the automatic document feeder, increasing cost and complexity.

DETAILED DESCRIPTION OF THE EXAMPLE EMBODIMENTS

Figure 2:
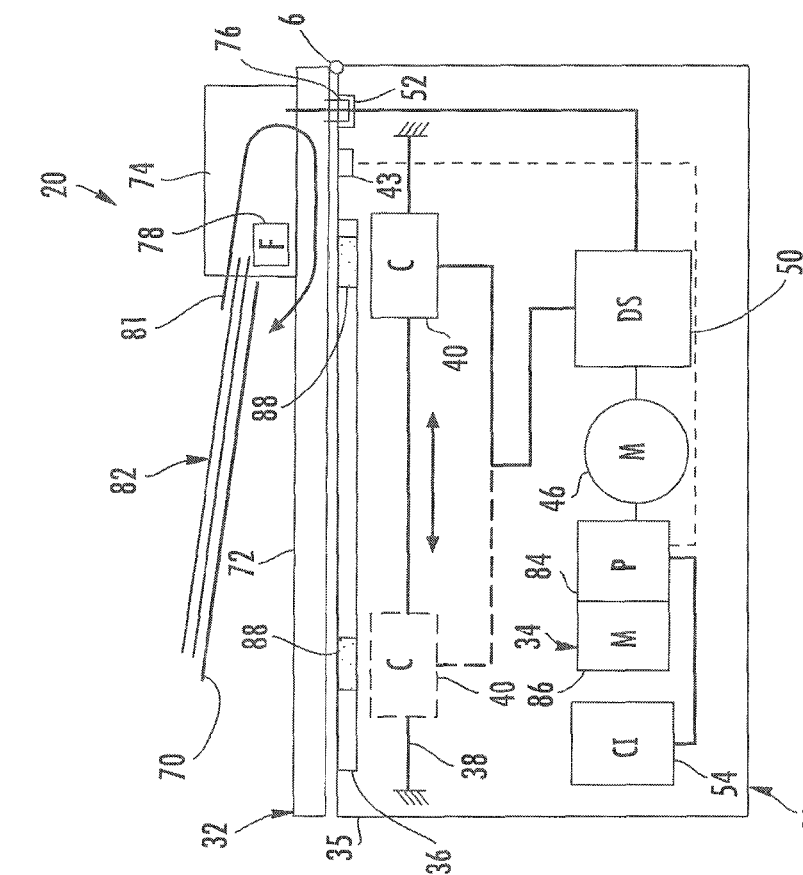
FIG. 2 is a side elevational view schematically illustrating the scanning system of FIG. 1 with the document feeder lid in a closed position according to an example embodiment.
Figure 1:
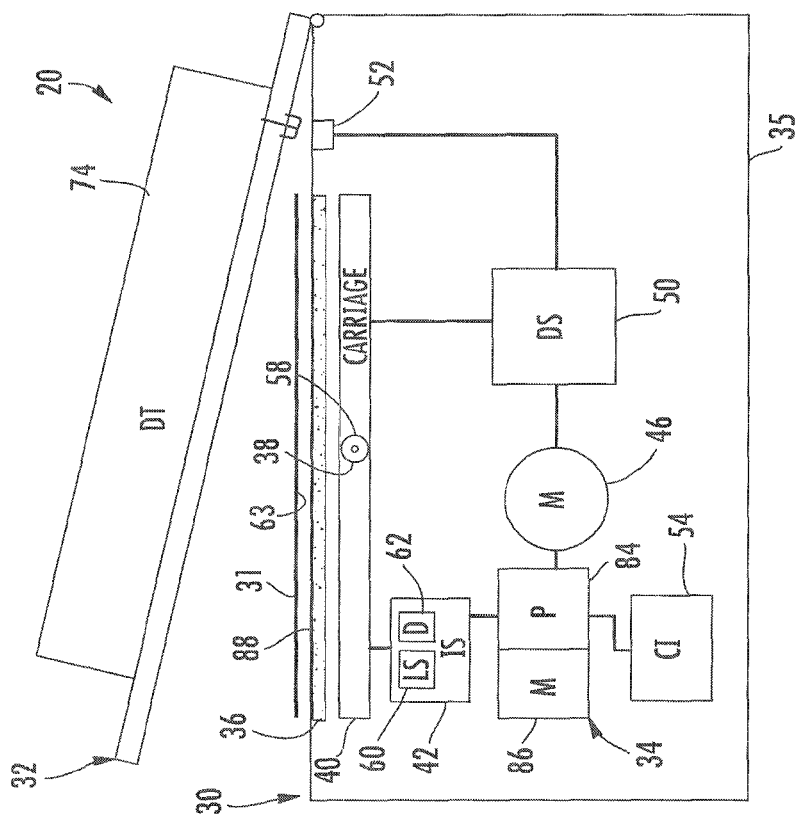
FIG. 1 is a front plan view schematically illustrating a scanning system with a document feeder lid in an open position according to an example embodiment.

FIGS. 1 and 2 schematically illustrate scanning system 20 according to an example embodiment. Scanning system 20 is configured to scan or sense image, data or other information from sheets of media to form one or more electronic files corresponding to the information from the sheets. As will be described hereafter, scanning system 20 facilitates both manual flatbed scanning and automatic document feeder scanning in a compact, less complex and less expensive manner.

Scanning system 20 includes scanner bed 30, automatic document feeder lid 32 and controller 34. Scanner bed 30 contains scanner elements and is configured to support sheets or documents 31 being scanned between lid 32 and bed 30. Scanner bed 30 includes housing 35, platen 36, guide 38, carriage 40, image sensor 42, motor 46, drive selector 50, power takeoff interface 52 and command interface 54. Housing 35 comprises one or more structures configured to at least partially enclose and support components of bed 30. Housing 35 may have a variety of sizes and configurations.

Platen 36 comprises a structure configured to support document 31 while light, such as visible light, is transmitted through platen 36. Platen 36 serves as a window through which images or information from document 31 are captured. Platen 36 is formed from a transparent material, such as glass or a transparent polymer. In the particular embodiment illustrated, platen 36 provides a generally horizontal surface upon which document 31 may rest as it is being scanned. In other embodiments, platen 36 may alternatively be supported in a vertical or inclined orientation.

Guide 38 comprises one or more structures configured to guide movement of carriage 40 along axis 58 relative to platen 36. In one embodiment, guide 38 comprises an elongate substantially rigid rod, wherein carriage 40 slides along the rod. In another embodiment, guide 38 may comprise one of a groove or channel and projection, wherein the carriage 40 includes the other of the channel and the projection, facilitating sliding of carriage 40 along guide 38. In other embodiments, other structures may be employed for movably supporting carriage 40. In some embodiments, guide 38 may be omitted, wherein linear actuator 44 additionally guides movement of carriage 40 along an axis 58.

Carriage 40 comprises one or more structures configured to move along axis 58 while carrying one or more components of image sensor 42. In particular, carriage 40 is configured to be moved across substantially an entirety of platen 36. During such movement, image sensor 42, or components thereof, is also moved across document 31 to move a sensing area 88 (schematically shown with stippling) also across platen 36, facilitating sensing of information from across document 31.

Image sensor 42 comprises an arrangement of components configured to sense characteristics of document 31. In one embodiment: come image sensor 42 includes light source 60 and detector 62 (schematically represented). Light source 60 comprises one or more sources of light and associated optics, if any, configured to supply light which is directed onto the face 63 of document 31. In one embodiment, light source 60 comprises a lamp. In another embodiment, light source 60 may comprise other sources for emitting visible light or other forms of light such as infrared light or ultraviolet light, depending upon the information upon document 31 to be sensed.

Detector 62 comprises one or more sensing devices and associated optics which are configured to sense light emitted by light source 60 and reflected off face 63. Such light reflected off face 63 of document 31 will vary depending upon printing, text or other images upon face 63. Detector 62 senses such variations in light and generates electrical signals which represent variations in light in the images upon face 63. The electrical signals are transmitted to controller 34 and are used by controller 34 to form an electronic image or copy of the image upon face 63.

According to one embodiment, light source 60 and detector 62 are configured to direct light upon and to sense reflected light that has concurrently passed through substantially an entire width of platen 36, wherein carriage 40 moves at least one of the light source and the detector across substantially an entire length of platen 36. In another embodiment, light source 60 and detector 62 may be configured to direct light upon a supported document and to sense reflected light that has concurrently passed through substantially an entire length of platen 36, wherein carriage 40 moves at least one of the light source and the detector across substantially an entire width of platen 36. In one embodiment, both light source 60 and detector 62 of image sensor 42 are carried by carriage 40. In another embodiment, light source 60 is carried by carriage 40 while detector 62 is supported in a stationary fashion independent of carriage 40, wherein light reflected from face 63 of document 31 is further directed by optics, including mirrors, to the stationary detector 62. In one embodiment, an additional carriage carrying mirrors may be driven at a proportional rate relative to movement of carriage 40 during such flat bed scanning.

Motor 46 comprises a source of torque. In one embodiment, motor 46 is configured to selectively apply torque in either direction. Motor 46 is operably connected to drive selector 50 such that torque is delivered to drive selector 50. In one embodiment, motor 46 comprises a DC motor. In other embodiments, other torque sources may be employed.

Drive selector 50 comprises a mechanism configured to receive torque from motor 46 that is actuatable between a carriage driving state in which selector 50 moves carriage 40 at least partially across platen 36 and a document feeder driving state in which selector 50 transmits torque to automatic document feeder lid 32 so as to drive one or more documents supported by lid 32 across image sensor 42. In the embodiment illustrated, drive selector 50 automatically switches between the carriage driving state and the document feeder driving state in response to or based upon positioning of carriage 40 and the direction of the torque supplied by motor 46. For example, in one embodiment, drive selector 50 may be configured to move carriage 40 along axis 58 until carriage 40 attains a certain position (switching position), at which point, torque is automatically switched and transferred to automatic document feeder lid 32. Conversely, in response to receiving torque in an opposite direction from motor, drive selector 50 may automatically switch from transmitting such torque to power takeoff interface 52 to drive carriage 40 away from the switching position and across platen 36. In another embodiment, drive selector 50 may alternatively actuate between the carriage driving state and the document feeder driving state in response to control signals received from controller 34.

Power takeoff interface 52 comprises a torque coupler operably coupled to drive selector 50 such that torque is delivered to interface 52 from drive a selector 50. Power takeoff 52 is configured to operably connect or engage a corresponding interface associated with automatic document feeder lid 32 to complete a transmission or power train from bed 30 to lid 32.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Command interface 54 comprises an interface for scanning system 20 by which externally originating instructions or commands may be provided to controller 34. In one embodiment, command interface 54 is configured to permit input of commands by a person operating scanning system 20. For example, in one embodiment, interface 54 may comprise a keyboard, keypad, touchpad, touch screen, mouse, button, switch, slide, lever or microphone with appropriate voice-recognition or speech recognition software. In other embodiments, interface 54 may be configured to permit input of control signals from an external electronic device such as an external computer or from a network or an Internet connected to other external electronic devices. Although command interface 54 is illustrated as being associated with bed 30, in other embodiments, command interface 54 may alternatively be associated with lid 32.

Automatic document feeder lid 32 comprises an arrangement of components configured to pick and move individual sheets or documents from a stack of documents across image sensor 42. Automatic document feeder lid 32 enables multiple documents to be sensed or scanned without a person having to individually place and locate such documents. Automatic document feeder lid 32 also serves as a lid by being actuatable between an opened position (shown in FIG. 1), providing a person with access to platen 36 such that a person may place an individual document 31 upon platen 36 for flatbed scanning and a closed position (shown in FIG. 2), covering platen 36 and substantially attenuating or blocking ambient or environmental light from interfering with the scanning of a document placed upon platen 36 or being sensed as it is moved across sensor 42. In the particular embodiment illustrated, lid 32 is pivotably connected to bed 30 along a hinge 68. In other embodiments, lid 32 may be movably connected to housing 35 of bed 30 in other fashions.

As will be described hereafter, automatic document feeder lid 32 receives and utilizes power from motor 46. As a result, automatic document feeder lid 32 may omit a dedicated motor for driving its components. Thus, automatic document feeder lid 32 may be more compact, lighter in weight and less expensive.

Automatic document feeder lid 32 generally includes input tray 70, output tray 72, document transport 74 and power takeoff interface 76. Input tray 70 comprises a structure configured to receive and store a stack of sheets or documents to be sensed. Input tray 70 further presents a stack of documents to document transport 74 such that document transport 74 may pick individual sheets from a stack for such sensing. Although automatic document feeder lid 32 is illustrated as having a single input tray 70, in other embodiments, lid 32 may have multiple input trays 70.

Output tray 72 comprises one or more structures configured to receive and store documents after such documents have been moved from input tray 70 across sensor 42 by document transport 74. In the embodiment illustrated, output tray 72 is formed substantially on top of that portion of lid 32 configured to cover platen 36. In other embodiments, output tray 72 may comprise a tray extending above that portion of lid 32 configured to cover platen 36. In some embodiments, lid 32 may be provided with multiple output trays 72.

Document transport 74 (schematically shown) comprises a mechanism configured to pick and separate individual documents 81 from a stack 82 of documents supported by input tray 70. Document transport 74 is further configured to transport or move the individual documents across sensor 42 to output tray 72. In the example embodiment illustrated, document transport 74 additionally facilitates the sensing of one or more positions of the documents on lid 32 using sensor 42. As a result, sensor 42 may serve at least dual purposes of (1) sensing images or data on a document and (2) detecting the positioning of one or more documents being fed or about to be fed by document transport 74. This dual use of sensor 42 may reduce the number of sensors used by system 20, further reducing the complexity and cost of system 20.

In one embodiment, document transport 74 may include one or more flags 78 (schematically shown) actuatable between different positions depending upon a presence or movement of one or more of documents 81. Flags 78 may be located such that the positioning of the one or more flags 78 may be sensed by sensor 42 when carriage 40 has positioned sensor 42 (or portions of sensor 42) at one or more appropriate positions along axis 58. For example, in one embodiment, one of flags 78 may be configured to actuate between two states depending upon a presence of documents 81 on tray 70. In addition, or alternatively, one of flags 78 may be configured to move in response to movement of documents 81 past selected points. In still other embodiments, flags 78 may be omitted, where sensor 42 directly senses the presence or movement of a document 81. In still other embodiments, document transport 74 may omit this feature.

Power takeoff interface 76 comprises a torque coupler operably coupled to document transport 74 and configured to connect to power takeoff interface 52 of bed 30. Interface 76 transmits torque received from interface 52 to document transport 74 for use by document transport 74 to move documents 81. As a result, document transport 74 may omit a dedicated motor or may include less expensive and less powerful motors.

In one embodiment, power takeoff interface 76 is configured to releasably connect to power takeoff interface 52. For example, in one embodiment, power takeoff interface 76 is configured to connect to power takeoff interface 52 for the transmission of torque or power when lid 32 is in the closed position. Power takeoff interface 76 is configured to disconnect from or disengage power takeoff interface 52 when lid 32 is moved or pivoted to the open position. Such disconnection may be the result of power takeoff interface 76 completely separating from power takeoff interface 52 or may be the result of power takeoff interface 76 moving a sufficient distance or being sufficiently reoriented with respect to power takeoff interface 52 such that transition of torque across interfaces 52 and 76 is disabled. In other embodiments, interface 76 may remain in a connected state with interface 52 regardless of whether lid 32 is open or closed.

According to one embodiment, power takeoff interface 52 may comprise a detent or female receptacle having a non-circular cross-sectional shape while power takeoff interface 76 comprises a projection or male member having a non-circular cross-sectional shape configured to be received within the receptacle and to mate or key to the receptacle such that rotation of the receptacle also rotates interface 76 to transmit torque. In yet another embodiment, this relationship may be reversed. In still other embodiments, interfaces 52 and 76 may have other mating or interlocking arrangements.

Controller 34 comprises one or more processing units 84 configured to generate control signals directing at least the operation of motor 46. As noted above, in some embodiments, controller 34 may additionally generate control signals actuating drive selector 50 between different torque transmitting states. In other embodiments, actuation of drive selector 50 may be achieved without drive selector 50 directly receiving control signals from controller 34. In some embodiments where sensor 42 senses positioning of documents with respect to document transport 74 or movement of documents 81 by document transport 74, such as when the one or more flags 78 are sensed, controller 34 may additionally utilize signals received from sensor 42 as at least a partial basis for generating such control signals. Controller 34 also receives signals from sensor 42 and uses the signals to generate an electronic file representative of images or data sensed or scanned from one or more of documents 31 or 81.

For purposes of this application, the term "processing unit" shall mean a presently developed or future developed processing unit that executes sequences of instructions contained in a memory 86. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 34 may be embodied as part of one or more application-specific integrated circuits (ASICs). Unless otherwise specifically noted, the controller is not limited to any specific combination of hardware circuitry and software, nor to any particular source for the instructions executed by the processing unit.

In operation, controller 34 determines whether scanning system 20 is to scan a document resting upon platen 36 or whether scanning system 20 is to move and scan one or more of documents 81 from stack 82 using automatic document feeder lid 32. In one embodiment, scanning system 20 may make such a determination based upon commands received via command interface 54. In another embodiment, controller 34 may make such a determination based upon whether a document 31 is resting upon platen 36, as sensed by sensor 42 or in other sensor (not shown) or whether at least one document 81 is present upon input tray 70 as sensed by sensor 42 or in other sensor (not shown). If both conditions exist, controller 34 may be programmed, per instructions contained in memory 86, to perform either flatbed scanning or automatic document feed scanning according to a predetermined default.

If a flatbed scanning is to be performed, controller 34 generates control signals directing motor 46 to supply torque in a first direction. In response to receiving the torque in the first direction from motor 46, drive selector 50 moves carriage 40 across platen 36. As carriage 40 moves across platen 36, image sensor 42 senses images or data from face 63 of document 31 resting upon platen 36. In particular, sensor 42 senses area 88 (schematically illustrated stippling) having a length less than a length of platen 36 and having a width substantially equal to or greater than a width of platen 36 as shown in FIGS. 1 and 2. As sensed information is transmitted to controller 34, processing unit 84 stores an electronic file, at least temporarily, representing the information in memory 86.

If a document 81 or a stack 82 of such documents 81 is to be scanned using automatic document feeder lid 32, controller 34 generates control signals directing motor 46 to supply torque in a second opposite direction. As a result, if drive selector 50 is still in the carriage driving state, drive selector 50 uses torque from motor 46 to move carriage 40 to a switching position such that drive selector 50 switches to the automatic document feeder driving state in response to the positioning of carriage 40. In the example illustrated, when carriage 40 is in the switching position (shown in solid lines in FIG. 2), drive selector 50 automatically switches to the automatic document feeder driving state. In the document feeder driving state, the torque being supplied by motor 46 in the second direction is alternatively directed to power takeoff interface 52. Power takeoff interface 52 transmits the torque to power takeoff interface 76 which transmits the torque to document transport 74. Document transport 74 utilizes the torque to perform one or more of picking an individual document 81 from stack 82 and moving the picked document across sensor 42 which scans and transmits sensed information corresponding to images upon the picked document 81 to controller 34. In the embodiment illustrated, document transport 74 uses the torque received via power takeoff interface 76 to perform both functions of picking document 81 from stack 82 and to move document 81 across sensor 42, permitting document transport 74 to perform its operations without an additional motor or torque source. Controller 34 uses the sensed information to generate an electronic file representing the sensed information, wherein the electronic file is stored in memory 86.

As shown by FIG. 2, in some embodiments, image sensor 42 may perform additional functions when carriage 40 is in the switching position. In particular, as torque is being delivered to document transport 74 of automatic document feeder lid 32, carriage 40 is stationary in the switching position. In some embodiments, sensor 42 may additionally sense the presence or movement of a document 81 with respect to automatic document feeder lid 32 by directly sensing the document 81 or sensing one or more of flags 78.

FIGS. 3-6 illustrates scanning system 120, another embodiment of scanning system 20 shown and described with respect to FIGS. 1 and 2. Like scanning system 20, scanning system 120 is configured to selectively perform both flatbed scanning and automatic document feeder scanning. Like scanning system 20, scanning system 120 utilizes a single torque source for driving components during flatbed scanning and for driving opponents during automatic document feeder scanning. As a result, scanning system 120 may be more compact, lighter in weight, less complex and less expensive.

Figure 4:
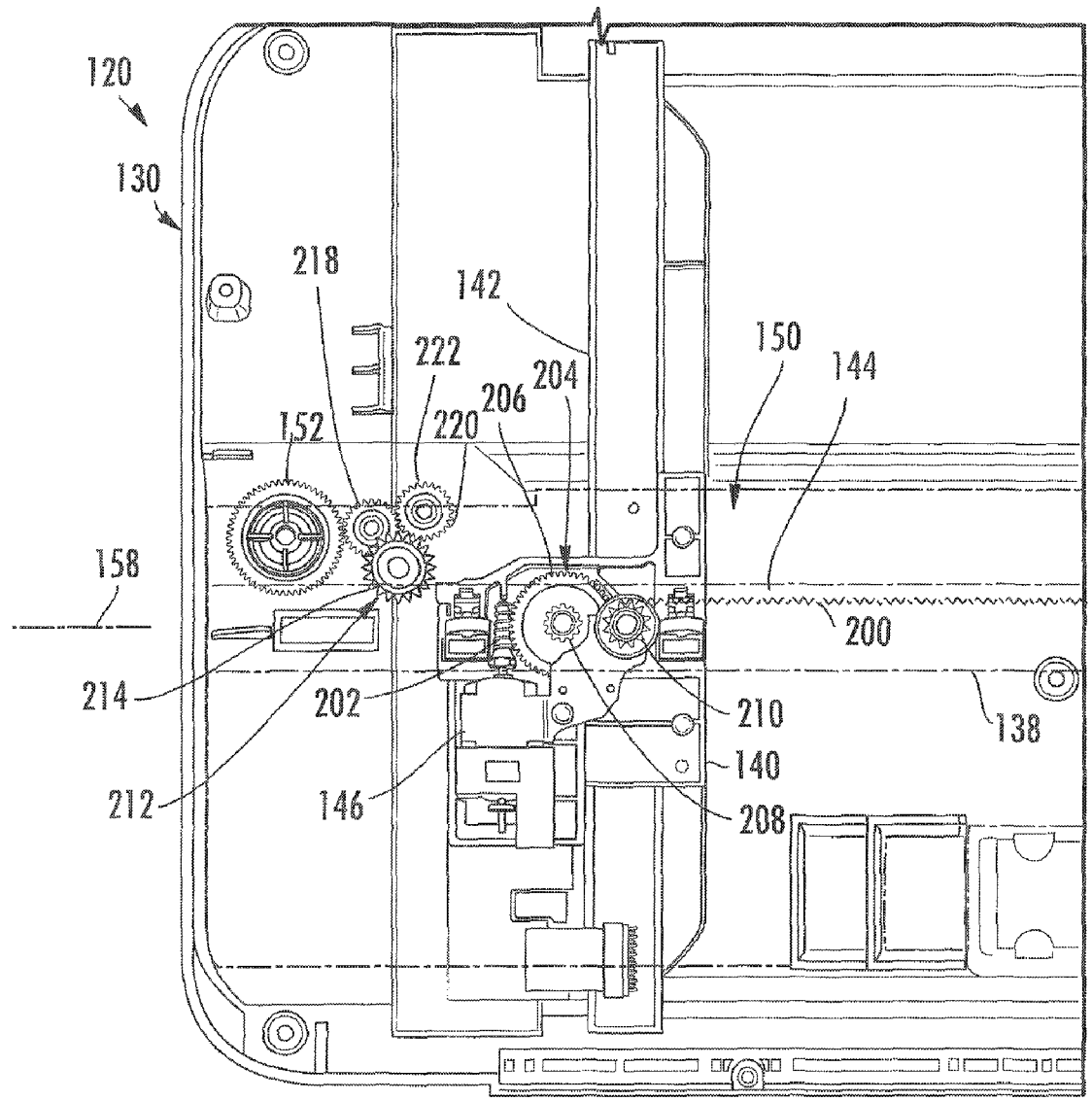
FIG. 4 is a bottom plan view of a bed of the scanning system of FIG. 3 in a carriage driving state according to an example embodiment with portions omitted for purposes of illustration.
Figure 5:
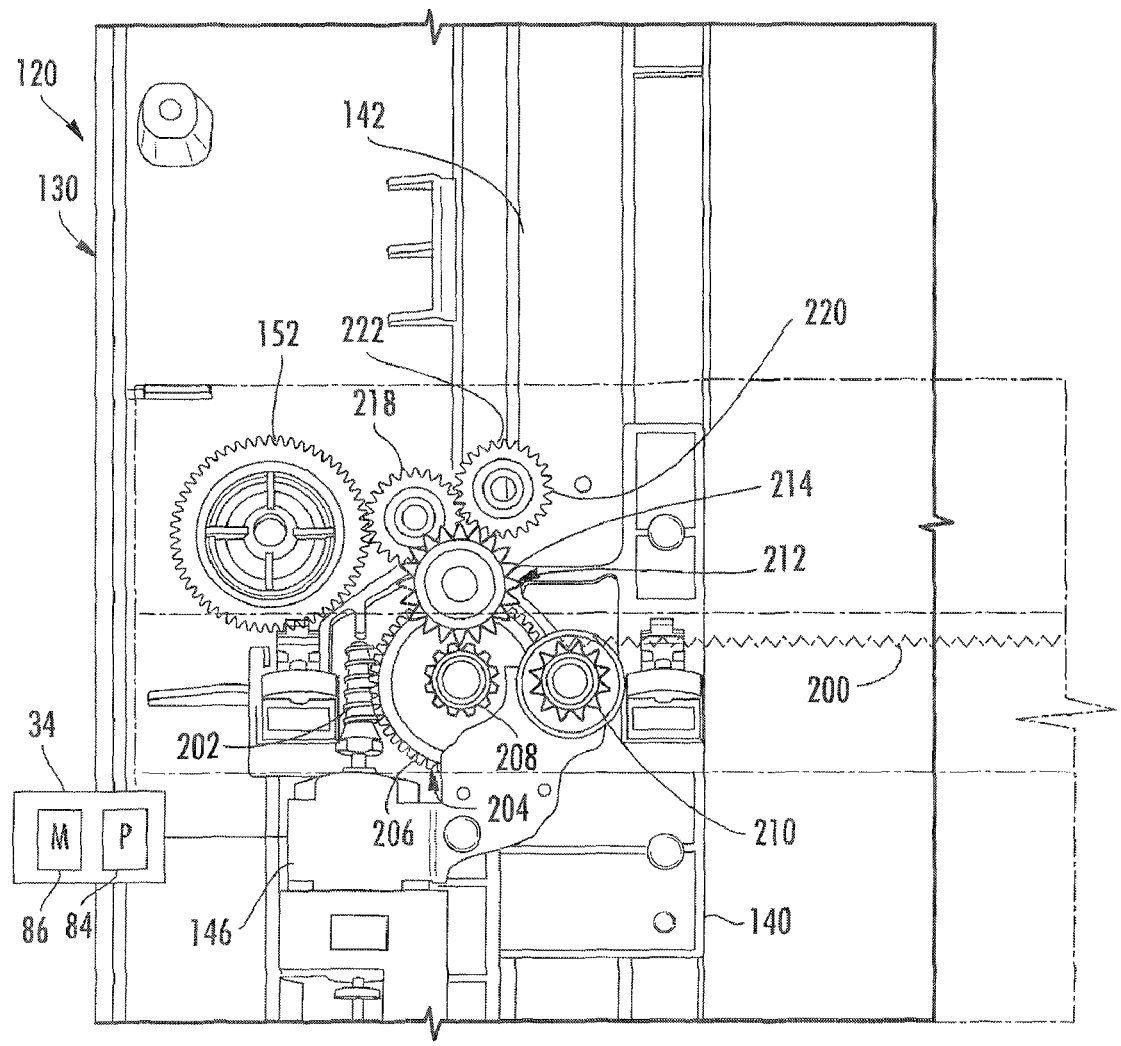
FIG. 5 is an enlarged bottom plan view of the bed of the scanning system of FIG. 3 in a document feeder driving state according to an example embodiment with portions omitted for purposes of illustration.

Scanning system 120 includes bed 130, automatic document feeder lid 132 and controller 34 (schematically shown in FIG. 5). Bed 130 includes housing 135, platen 136, guide 138 (shown in FIG. 4), carriage 140 (shown in FIG. 4), image sensor 142 (shown in FIG. 4), motor 146, drive selector 150, power takeoff interface 152 and command interface 54 (schematically shown and described with respect to FIGS. 1 and 2). Housing 135 comprises one or more structures configured to at least partially enclose and support components of bed 30. Housing 135 may have a variety of sizes and configurations.

Platen 136 comprises a structure configured to support a document while light, such as visible light, is transmitted through platen 136. Platen 136 serves as a window through which images or information from document are captured. Platen 136 is formed from a transparent material, such as glass or a transparent polymer. In the particular embodiment illustrated, platen 136 provides a generally horizontal surface upon which a document may rest as it is being scanned. In other embodiments, platen 136 may alternatively be supported in a vertical or inclined orientation.

FIG. 4 illustrates guide 138, carriage 140 and drive selector 150 in more detail. FIG. 4 is a sectional view looking upward through bed 130. As shown by FIG. 4, guide 138 comprises one or more structures configured to guide movement of carriage 40 along axis 158 relative to platen 136. In one embodiment, guide 138 comprises an elongate substantially rigid rod, wherein carriage 140 slides along the rod. In another embodiment, guide 138 may comprise one of a groove or channel and projection, wherein the carriage 140 includes the other of the channel and the projection, facilitating sliding of carriage 140 along guide 138. In other embodiments, other structures may be employed for movably supporting carriage 140.

Carriage 140 comprises one or more structures configured to move along axis 158 while carrying one or more components of image sensor 142. In particular, carriage 140 is configured to be moved across substantially an entirety of platen 136. During such movement, image sensor 142, or components thereof, is also moved across a document resting upon platen 136, facilitating sensing of information from across the document.

Image sensor 142 comprises an arrangement of components configured to sense characteristics of the document. In one embodiment, image sensor 142 includes light source 60 and detector 62 (schematically shown in FIG. 1). Light source 60 comprises one or more source of light and associated optics, if any, configured to supply light which is directed onto the of a document 31. In one embodiment, light source 60 comprises a lamp. In another embodiment, light source 60 may comprise other sources for emitting visible light or other forms of light such as infrared light or ultraviolet light, depending upon the information upon the document to be sentenced.

Detector 62 comprises one or more sensing devices and associated optics which are configured to sense light emitted by light source 60 in reflected off a document. Such reflected will vary depending upon printing, text or other images upon the document. Detector 62 senses such variations in light and generates electrical signals which represent variations in light in the images. The signals are transmitted to controller 34 and used by controller 34 to form an electronic image or copy of the image upon the document.

Motor 146 comprises a source of torque. In one embodiment, motor 146 is configured to selectively apply torque in either direction. Motor 146 is operably connected to drive selector 150 such that torque is delivered to drive selector 150. In one embodiment, motor 146 is mounted upon and is moved by carriage 40 while being connected to drive selector 150. In one embodiment, motor 46 comprises a DC motor. In other embodiments, other torque sources may be employed.

Like drive selector 50, drive selector 150 comprises a mechanism configured to receive torque from motor 146 that is actuatable between a carriage driving state in which selector 150 moves carriage at least partially across platen 136 and a document feeder driving state in which selector 150 transmits torque to automatic document feeder lid 132 so as to drive one or more documents supported by lid 132 across image sensor 142. In the embodiment illustrated, drive selector 150 automatically switches between the carriage driving state and the document feeder driving in response to or based upon positioning of carriage 140 and the direction of the torque supplied by motor 146. For example, in one embodiment, drive selector 150 may be configured to move carriage 140 along axis 158 until carriage 140 attains a certain position (switching position), at which point, torque is automatically switched and transferred to automatic document feeder lid 132. Conversely, in response to receiving torque in an opposite direction from motor, drive selector 150 may automatically switch from transmitting such torque to power takeoff interface 152 to driving carriage 140 away from the switching position and across platen 136.

As shown by FIG. 4, drive selector 150 includes rack gear 200, worm gear 202, cluster gear 204, including a helical gear 206, and pinion gear 208, drag gear 210, cluster gear 212 including gears 214, 216, intermediate gear 218, locking gear 220 and catch 222. Rack gear 200 and pinion gear 208 serve as a linear actuator for converting torque supplied by motor 146 into linear motion for moving carriage 140 across platen 136. Rack gear 200 extends substantially across a length of platen 136 beneath platen 136. Rack gear 200 assists in guiding movement of carriage 140 across platen 136.

Worm gear 202 is coupled to an output shaft of motor 146. Worm gear 202 is in meshing engagement with helical gear 206 of cluster gear 204. Pinion gear 208 of cluster gear 204 extends from helical gear 206 and is positioned to be either in meshing engagement with a rack gear 144 or in engagement with gear 214 of cluster gear 212.

Drag gear 210 comprises a spur or pinion gear rotationally supported by carriage 140 in idling engagement with rack gear 144. Drag gear 210 is configured to remain in engagement with rack gear 200 when pinion gear 208 is out of engagement with rack gear 200 (while pinion gear 208 is alternatively in engagement with gear 214). Drag gear 210 assists in applying a drag or load to maintain pinion gear 208 in engagement with rack gear 200. In other embodiments, drag gear 210 may be omitted.

Cluster gear 212, intermediate gear 218, locking gear 220 and catch 222 cooperate to transmit torque from pinion gear 208 to power takeoff interface 152 when pinion gear 208 is in meshing engagement with gear 212 and is being rotationally driven in a first direction. At the same time, gears 212, 218, 220 and catch 222 cooperate to facilitate disengagement of pinion gear 208 from gear 214 and re-engagement with rack gear 200 when pinion gear 208 is being rotationally driven in a second opposite direction.

Figure 6:
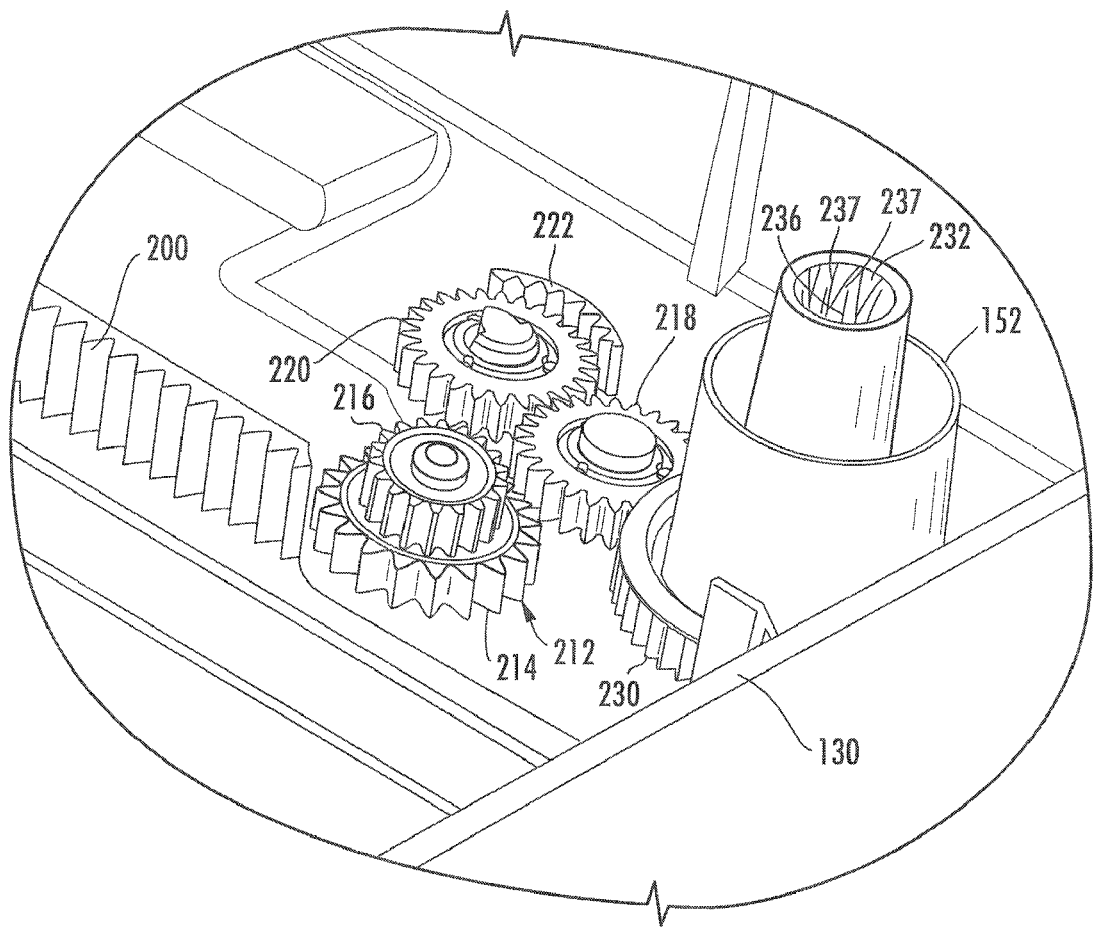
FIG. 6 is an enlarged fragmentary perspective view of the scanning system of FIG. 3 according to an example embodiment.

FIG. 6 illustrates cluster gear 212, intermediate gear 218, locking gear 220 and catch 222 in more detail. Cluster gear 212 comprises a gear rotationally supported by housing 135 proximate an end of rack gear 200. Gear 214 of cluster gear 212 is located so as to be engaged by and to intermesh with pinion gear 208 as pinion gear 208 is rotated off of rack gear 200. Gear 214 receives torque from pinion gear 208 and transmits the torque to gear 216. According to one example embodiment, the teeth of gear 214 are configured to push guides on carriage 140 against a reference surface to stabilize carriage 140. In one embodiment, the teeth of gear 214 have a 30 degree pressure angle. In other embodiments, gear 214 may have other configurations.

Gear 216 of cluster gear 212 is in meshing engagement with intermediate gear 218. Intermediate gear to 218 is rotationally supported by housing 235 and is in concurrent meshing engagement with locking gear 220 and power takeoff interface 152. Intermediate gear 218 transmits torque to power takeoff interface 152 when drive selector 150 is in the document feeder driving state and locks up with locking gear 220 when drive selector 150 is in the carriage driving state.

Locking gear 220 comprises a spur or pinion gear rotationally supported by housing 135 such that locking gear 220 may move between a first state in which locking gear 220 is out of engagement with catch 222 such that gear 220 is rotatable and a second state in which locking gear 220 moves into engagement with catch 222 to inhibit rotation of gear 220. In one embodiment, gear 220 is held in place by a shaft having an ovular cross-sectional shape smaller than an inner diameter of gear 220, permitting gear 220 to move towards or away from catch 222. In other embodiments, gear 220 may be supported in other fashions such that gear 220 moves out of engagement with catch 222 and rotates in response to torque applied in a first direction and moves into engagement with and locks with catch 222 in response to torque applied in a second opposite direction.

Catch 222 comprises a structure configured to engage gear 220 so as to lock or inhibit rotation of gear 220. In the particular example illustrated, catch 222 comprises a multitude of teeth extending from housing 135 opposite to teeth of gear 220. In other embodiments, catch 222 may comprise a single tooth, pawl, prong or other structure configured to lock rotation of gear 220.

FIG. 4 illustrates drive selector 150 in the carriage driving state. In particular, pinion gear 208 is in engagement with rack gear 200. As a result, torque supplied by motor 156 is transmitted to pinion gear 208 by worm gear 202 and helical gear 206 so as to move pinion gear 208 along rack gear 200 and so as to also moving carriage 140 and sensor 142 along axis 158. Torque supplied by motor 146 in either direction moves carriage 140 and sensor 142 in either direction along axis 158 while pinion gear 208 is in engagement with rack gear 200.

FIG. 5 illustrates drive selector 150 in the document feeder driving state. Drive selector 150 is in the document feeder driving state when pinion gear 208 has been rotated a sufficient extent along rack gear 200 such that pinion gear 208 rolls off of rack gear 200 into engagement with the teeth of gear 214 of cluster gear 212. Upon disengagement of pinion gear 208 from rack gear 200, any further rotation of pinion gear 208 (in a clockwise direction has seen in FIG. 5) does not result in linear movement of carriage 140, but rotates gear 212. Gear 212 applies torque to intermediate gear 218. Intermediate gear 218 applies torque to gear 220 such that locking gear 220 moves out of engagement and is maintained in a disengaged state with respect to catch 222 as gear 220 rotates. As a result, gear 212 transmits torque to power takeoff interface 152 via intermediate gear 218.

To return drive selector 150 to the carriage driving state, controller 34 (shown in FIG. 5) generates control signals directing motor 146 to apply torque in a second opposite direction such that pinion gear 208 is driven in a counterclockwise direction (as seen in FIG. 5). As a result, torque is transmitted via gear 212 to intermediate gear 218 which moves locking gear 220 into locking engagement with catch 222 once locking gear 220 is locked to catch 222 and gears 212, 218 and 220 are also locked against rotation. Continued rotation of pinion gear 208 in the counterclockwise direction (as seen in FIG. 5) causes pinion gear 208 to roll off of the teeth of gear 212 and back onto the teeth of rack gear 200. Yet further rotation of pinion gear 208 moves pinion gear 208 along rack gear 200 to move carriage 140 and image sensor 142 along axis 158.

Power takeoff interface 152 comprises a torque coupler operably coupled to drive selector 150 such that torque is delivered to interface 152 from drive a selector 150. Power takeoff interface 152 is configured to operably connect or engage a corresponding interface associated with automatic document feeder lid 132 to complete a transmission or drive train from bed 130 to lid 132. As shown by FIG. 6, in the particular example illustrated, power takeoff interface 152 includes a lower spur gear 230 and an upper bore 232 having a noncircular interior cross-sectional shape configured to be interlocked or keyed with a corresponding interface of document feeder lid 132, facilitating releasable removable connection and also facilitating transmission of torque.

In the particular embodiment illustrated, upper bore 232 of power takeoff interface 152 is configured to self align with power takeoff interface 176. As shown by FIG. 6, bore 232 includes internal V-shaped substantially vertical grooves 236 and ramps 237. Grooves 236 encircle a rotational axis of interface 152. Grooves 236 are configured to receive corresponding portions of interface 176, which may comprise a hex-shaped male connector in one embodiment. Ramps 237 are located adjacent to a mouth of bore 232 and are arranged in pairs between consecutive grooves 236. The pairs of ramps between consecutive grooves 236 slope away from one another and also slope in a radial inward direction. In one embodiment, the corresponding teeth of interface 176 are similarly configured. Ramps 237 cooperate with the corresponding ramps or teeth of interface 176 such that one or both of interfaces 152 and 156 rotate relative to one another upon their engagement with one another to self align and position the teeth of interface 176 in the grooves 236 of interface 152. Ramps 237 cause a torque to self align interface 152 and 176.

As a result, lid 132 may be fully closed and engaged to interface 152 without having to manually turn interfaces 152 and 176 into alignment.

Figure 3:
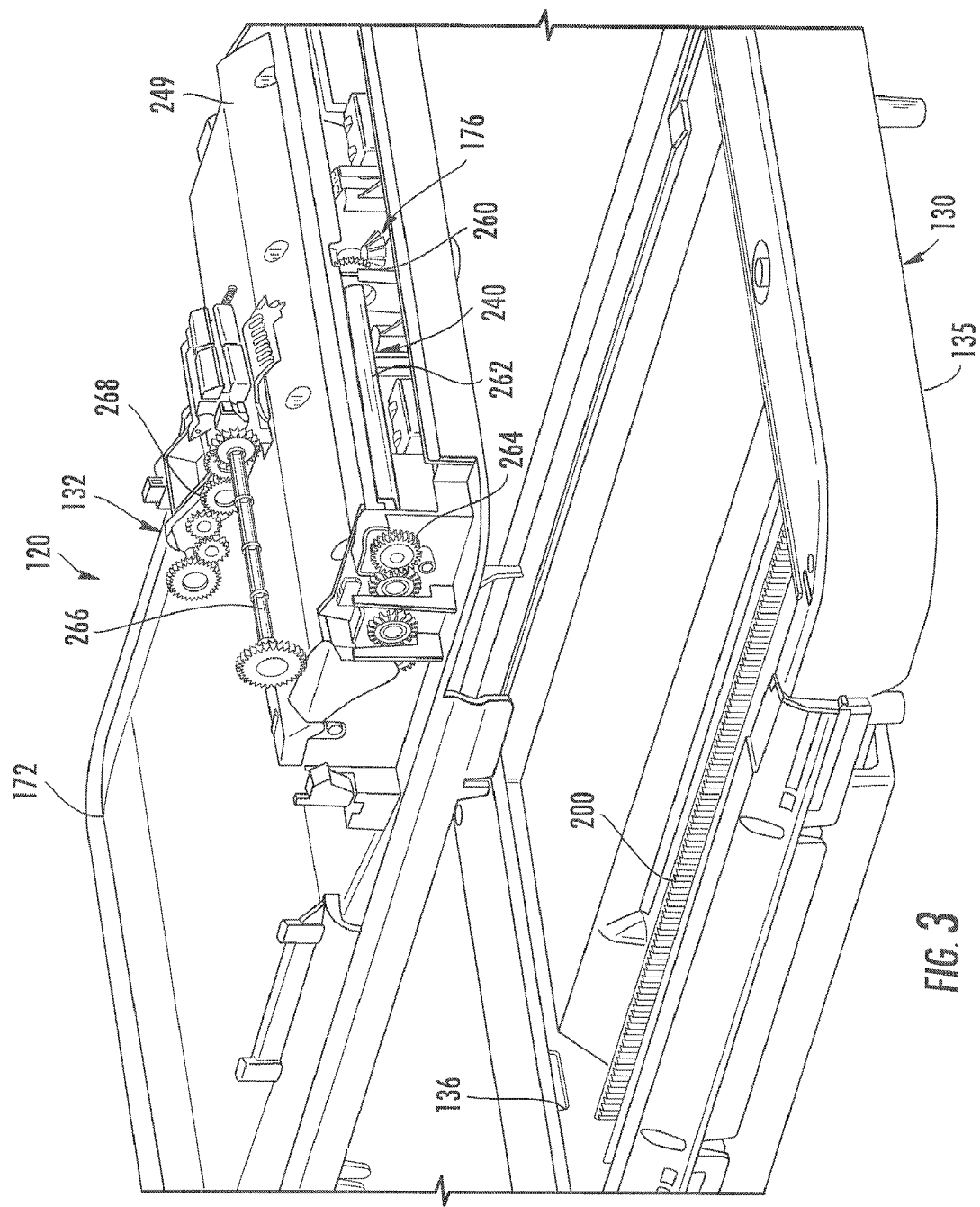
FIG. 3 is a fragmentary top perspective view of another embodiment of the scanning system of FIG. 1 according to an example embodiment with portions omitted for purposes of illustration.
Figure 7:
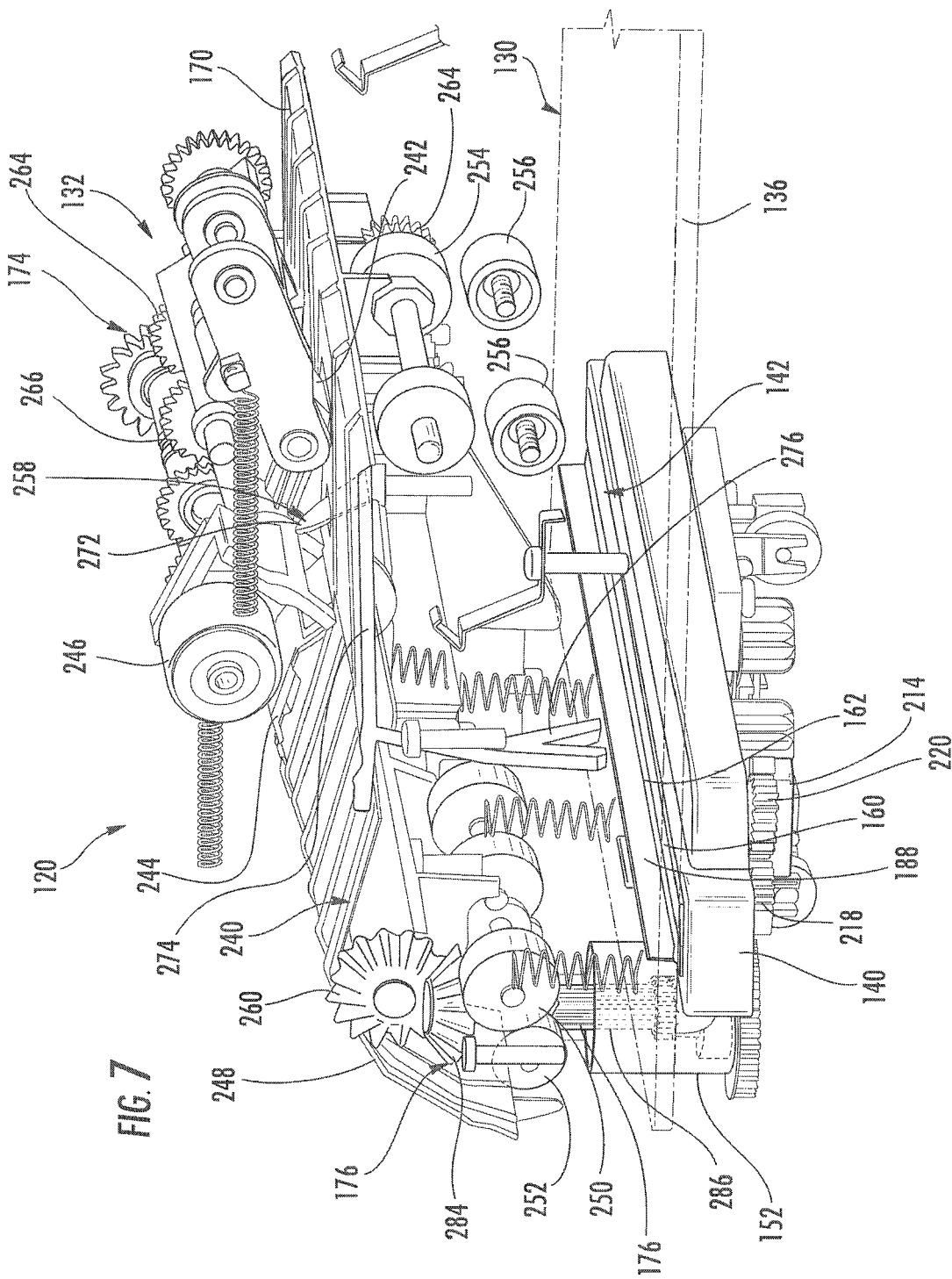
FIG. 7 is a top perspective view of the scanning system of FIG. 3 according to an example embodiment with portions omitted for purposes of illustration.

FIGS. 3 and 7 illustrate automatic document feeder lid 132. FIG. 3 illustrates document feeder lid 132 with a topmost cover or shield removed for purposes of illustration. FIG. 7 illustrates document feeder lid 132 with the cover, a lower core and the output tray 172 (shown in FIG. 3) removed for purposes of illustrating internal components of lid 132. Automatic document feeder lid 132 includes input tray 170 (shown in FIG. 7), output tray 172, document transport 174 and power takeoff interface 176.

Input tray 170 comprises a structure configured to receive and store a stack of sheets or documents to be sensed. Input tray 170 further presents a stack of documents to document transport 174 such that document transport 174 may pick individual sheets from a stack for such sensing. Although automatic document feeder lid 132 is illustrated as having a single input tray 170, in other embodiments, lid 132 may have multiple input trays 170.

Output tray 172 comprises one or more structures configured to receive and store documents after such documents have been moved from input tray 170 across sensor 42 by document transport 174. In the embodiment illustrated, output tray 172 is formed substantially on top of that portion of a lid 132 configure to cover platen 136. In other embodiments, output tray 172 may comprise a tray extending above that portion of lid 132 configure to cover platen 36. In some embodiments, lid 132 may be provided with multiple output trays 172.

Document transport 174 comprises a mechanism configured to pick and separate individual documents from a stack of documents supported by input tray 170. Document transport 174 is further configured to transport or move the individual documents across sensor 142 (shown in FIG. 4) to output tray 172. In the example embodiment illustrated, document transport 174 additionally facilitates the sensing of one or more positions of the documents on lid 132 using sensor 142. As a result, sensor 142 may serve at least dual purposes of (1) sensing images or data on a document and (2) detecting the positioning of one or more documents being fed or to be fed by document transport 174. This dual use of sensor 142 may reduce the number of sensors used by system 120, further reducing the complexity and cost of system 120.

Document transport 174 includes power train 240, pick tire 242, separation pad 244, separation roller 246, guide surfaces 248, driven rollers 250, idling rollers 252, driven rollers 254 and idling rollers 256, and flag 258. Power train 240 comprises a series of torque transmitting members operably connected to power takeoff interface 176 and configured to deliver such torque to driven components of automatic document feeder lid 132. In the particular embodiment illustrated, power train 240 delivers torque to pick tire 242, separation roller 246, driven rollers 250 and driven rollers 254.

As shown in FIG. 3, power train 240 includes bevel gear 260, shaft 262, gear train 264, shaft 266 and gear train 268. Bevel gear 260 is configured to mesh with a corresponding bevel gear of power takeoff interface 176. In other embodiments, power train 240 may interconnect to power takeoff interface 176 in other fashions. Shaft 262 extends from bevel gear 260 and is connected to gear train 264. Gear train 264 includes a multitude of intermeshing gears, wherein one of the gears of gear train 264 is operably connected to driven rollers 250 and another of the gears of gear train 264 is operably connected to a shaft of driven rollers 254. Gear train 264 extends to shaft 266. Shaft 266 extends from gear train 264 into operable engagement with gear train 268. Gear train 268 extends to pick tire 242 so as to rotationally drive pick tire 242. Although power train 240 is illustrated as including multiple shafts and gear trains for transmitting torque to the driven components, in other embodiments, power train 240 may have a variety of other arrangements of shafts and gear trains for delivering such torque. In still other embodiments, power train 240 may include other transmission arrangements such as chain and sprocket arrangements, belt and pulley arrangements or combinations of gear trains, belt and pulley arrangements, and chain and sprocket arrangements.

Pick tire 242 comprises a roller configured to frictionally engage a sheet of a stack of sheets upon input tray 170. Pick tire 242 is rotationally driven by power train 240 to pick the top most document and to move the picked document to a nip formed between separation pad 244 and separation roller 246. Although lid 132 is illustrated as including a single pick tire 242, in other embodiments, lid 132 may include additional pick tires 242.

Separation pad 244 comprises a pad or surface of friction material extending opposite to separation roller 246 which is driven by shaft 266 of power train 240. Separation roller 246 drives a picked document further along guide surfaces 248. At the same time, separation pad 244 inhibits underlying sheets which may be adhering to the topmost sheet from being moved past separation pad 244 to reduce likelihood of a multi-pick.

Guide surfaces 248 comprise surfaces configured to cooperate with opposite surfaces are rollers of a cover 249 (part of which is shown if FIG. 3) so as to turn the picked sheet into a nip formed between driven rollers 250 and idling rollers 252. Driven rollers 250 are rotationally driven by one of the gears of gear train 264. Idling rollers 252 are rotationally supported by a support structure, such as the lower core (not shown) opposite to driven rollers 250. Driven rollers 250 and idling rollers 252 cooperate to pinch and move a picked document further along and across sensing area 188 of sensor 142 when carriage 140 is parked in the switching position as shown in FIG. 7.

Driven rollers 254 are driven by one of the gears of gear train 264 and extend opposite to idling rollers 256. Idling rollers 256 are rotationally supported by the lower core (not shown). Driven roller 254 and idling rollers 256 cooperate to pinch and move the document from sensing area 188 to output tray 172 (shown in FIG. 3).

Figure 8:
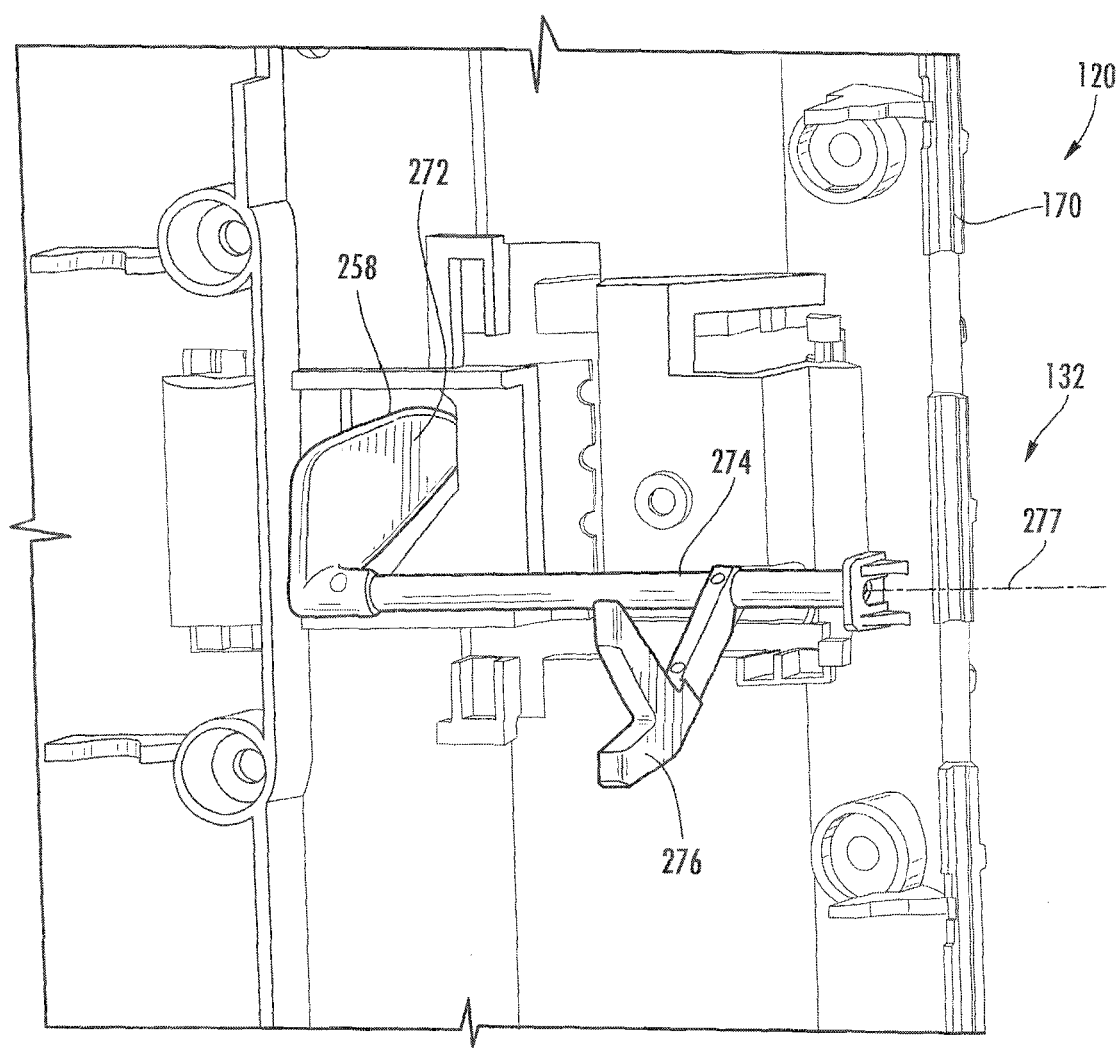
FIG. 8 is an enlarger fragmentary bottom plan view of a portion of the scanning system of FIG. 7 illustrating a flag of the system according to an example embodiment.

Flag 258 comprises a structure configured to move in response to the presence or movement of one or more documents. In the particular example illustrated, flag 258 is configured to move in response to the presence of one or more documents upon input tray 170. Flag 258 is further configured such that movement of flag 258 may be viewed or detected by image sensor 142. As shown by FIG. 8, in the particular example illustrated, flag 258 includes tab portion 272, intermediate portion 274 and sensed portion 276. Portion 272 comprises a projection extending through an opening in input tray 170 above input tray 170 and between pick tire 242 and separation pad 244. Portion 272 is configured to be engaged by one or more documents which are placed upon input tray 170 and loaded into lid 132 such that portion 276 pivots or rotates in a direction about axis 277 of portion 276.

Intermediate portion 274 interconnects portion 272 and sensed portion 276. Intermediate portion 274 is rotationally supported on an underside of tray 170 and extends to sensed portion 276.

Sensed portion 276 comprises a member extending from intermediate portion 274 and is configured to have a range of motion, which within sensing area 188 or intersecting sensing area 188, enabling sensor 142 to detect the position or movement of sensed portion 276. Although sensed portion 276 is illustrated as a prong, sensed portion 276 may have other configurations.

In operation, loading of one or more documents upon input tray 170 presses portion 272 in a sideways or lateral direction generally perpendicular to the direction in which media is loaded onto tray 170. This results in intermediate portion 274 being rotated about axis 277. Such rotation of intermediate portion 274 causes sensed portion 276 to also rotate. As sensed portion 276 rotates, it intersects or moves within the focal point of sensing area 188. As a result, image sensor 142 transmit signals to controller 34 indicating to controller 34 that one or more sheets have been loaded onto input tray 170 and are ready for being scanned.

Although flag 258 is illustrated and described as having the above configuration, in other embodiments, flag 258, may have other configurations. Although flag 258 is illustrated as being located and configured so as to sense the presence of one or more documents upon input tray 170, in other embodiments, flag 258 may be configured to move in response to movement of a document along a media path in lid 132. In other embodiments, image sensor 142 may be configured to sense the presence of one or more documents or the movement of one or more documents in other fashions. For example, image sensor 142 may additionally be configured to directly sense the presence of a document or movement of a document by sensing through one or more openings in the lower core (not shown) of lid 132, through openings in tray 170 or through openings in other portions of lid 132. Image sensor 142 may be configured to sense other flags which move in response to the presence of one or more documents or which move in response to movement of one or more documents along a media path. In other embodiments, flag 258 may be omitted.

Power takeoff interface 176 comprises a torque coupler operably coupled to document transport 174 and configured to connect to power takeoff interface 152 of bed 130. Power takeoff interface 176 completes a drive train that extends from motor 146 to document transport 174, wherein the drive train has a first portion below platen 136 and a second portion carried by lid 132. Interface 176 transmits torque received from interface 152 to document transport 174 for use by document transport 174 to move documents. As a result, document transport 174 may omit a dedicated motor or may include less expensive and less powerful motors.

In one embodiment, power takeoff interface 176 is configured to be releasably connected to power takeoff interface 152. For example, in one embodiment, power takeoff interface 176 is configured to connect to power takeoff interface 152 for the transmission of torque or power when lid 132 is in the closed position. Power takeoff interface 176 is configured to disconnect from or disengage power takeoff interface 152 when lid 132 is moved or pivoted to the open position. Such disconnection may be the result of power takeoff interface 176 completely separating from power takeoff interface 152 or may be the result of power takeoff interface 176 being moved a sufficient distance or being sufficiently reoriented with respect to power takeoff interface 152 such that transmission of torque across interfaces 152 and 176 is disabled. In other embodiments, interface 176 may remain in a connected state with interface 152 regardless of whether lid 132 is open or closed.

In the particular embodiment illustrated, power takeoff interface 176 includes power train connection portion 284 and projection portion 286. Power train connection portion 284 is connected to power train 240 such that movement of interface 176 also results in movement of power train 240. In the particular example illustrated, connection portion 284 is configured to transmit torque and to redirect such torque approximately 90 degrees such that torque may be transmitted in a direction across lid 132. In the particular example illustrated, connection portion 284 comprises a bevel gear in meshing engagement with a corresponding bevel gear 260 of power train 240. In other embodiments, other torque coupling arrangements may be employed.

Projection portion 286 comprises a projection configured to be received within bore 232 of power takeoff interface 152 of bed 130. Projection portion 286 has a non-circular cross-sectional shape such that rotation of interface 152 will also result in rotation of interface 176. In one embodiment, bore 232 and projection portion 286 have complementary non-circular cross-sectional shapes such that bore 232 and projection portion 286 mate, key or interlock for reduced likelihood of relative slippage. In other embodiments, interface 152 and interface 176 may have other configurations facilitating transmission of torque and motion from bed 130 to lid 132. For example, although interface 152 includes a female receptacle or bore 232 while interface 176 includes a male projection portion 286, in other embodiments, this relationship may be reversed.

Overall, scanning system 120 operates as follows. Controller 34 determines whether scanning system 120 is to scan a document resting upon platen 136 or whether scanning system 120 is to move and scan one or more of documents using automatic document feeder lid 132. In one embodiment, scanning system 120 may make such a determination based upon commands received via command interface 54 (shown and described with respect to FIG. 2). In another embodiment, controller 34 may make such a determination based upon whether a document is resting upon platen 136, as sensed by sensor 142 or in another sensor (not shown) or whether at least one document is present upon input tray 170 as sensed by sensor 142, sensing flag 258, or another sensor (not shown). If both conditions exist, controller 34 may be programmed, per instructions contained in memory 86, to perform either flatbed scanning or automatic document feed scanning according to a predetermined default.

If a flatbed scanning is to be performed, controller 34 generates control signals directing motor 146 to supply torque in a first direction. In response to receiving the torque in the first direction from motor 146, pinion gear 208 interacts with rack gear 200 to move carriage 140 across platen 136. As carriage 140 moves across platen 136, image sensor 142 senses images or data from the document resting upon platen 136. In particular, sensor 142 senses an area 188 having a length less than a length of platen 136 and having a width substantially equal to or greater than a width of platen 136 as shown in FIG. 7. As sensed information is transmitted to controller 34, processing unit 84 of controller 34 stores an electronic file, at least temporarily, representing the information in memory 86.

If a document is to be scanned using automatic document feeder lid 132, controller 34 generates control signals directing motor 146 to supply torque in a second opposite direction. As a result, if drive selector 150 is still in the carriage driving state (i.e., pinion gear 208 is still in engagement with rack gear 200), pinion gear 208 rotates relative to rack gear 200 to move carriage 140 until drive selector 150 is in the document feeder driving state (i.e., pinion gear 208 is disengaged from rack gear 200 and is in engagement with gear 212 at the end of rack gear 200). In the document feeder driving state, the torque being supplied by motor 146 in the second direction is alternatively directed to power takeoff interface 152. Power takeoff interface 152 transmits the torque to power takeoff interface 176 which transmits the torque to power train 240. Power train 240 utilizes the torque to drive one or more of pick tire 242, separation roller 242 and driven rollers 250 and 254. As a result, the document upon tray 170 is separated from an underlying stack, if any, and is driven across a substantially stationary sensing area 188 (shown in FIG. 7). Image sensor 142 transmits signals representing image or information upon the document to controller 34. Controller 34 uses the signals from image sensor 142 to generate an electronic file representing the sensed information, wherein the electronic file is stored in memory 86.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements

What is claimed is:

1. A scanning system comprising:
   a carriage movable to reposition a sensing area;
   a document transport configured to move a document relative to the sensing area;
   a motor operably coupled to the carriage and the document transport so as to selectively move an entirety of the document across the sensing area while the carriage remains stationary or move the carriage to move the sensing area;
   a pivotable lid carrying the document transport; and
   an input tray and an output tray proximate the document transport and carried by the lid.

2. The scanning system of claim 1 further comprising an image sensor configured to sense across an entire dimension of the document while the carriage remains stationary.

3. The scanning system of claim 2, wherein the image sensor is carried by the carriage.

4. The scanning system of claim 2 further comprising at least one mirror carried by the carriage, wherein the carriage is movable relative to the image sensor and wherein the image sensor is configured to sense light reflected off the mirror.

5. The scanning system of claim 1 further comprising:
   a first torque coupler operably coupled to the motor and carried by the carriage; and
   a second torque coupler operably coupled to the document transport, wherein the carriage is configured to be moved to a torque transmitting position in which the first torque coupler is engaged with the second torque coupler.

6. The scanning system of claim 1 further comprising:
   a linear actuator comprising:
   a rack gear; and
   a first pinion gear connected to the carriage and driven by the motor, wherein movement of the pinion gear along the rack gear moves the carriage; and
   a document transport drive train operably coupled to the document transport and comprising a second pinion gear at an end of the rack gear, wherein engagement of the first pinion gear and the second pinion gear transmits power from the motor to the document transport.

7. The scanning system of claim 6, wherein the document transport drive train further comprises:
   a third pinion gear operably coupled between the second pinion gear and the document transport;
   a catch; and
   a fourth pinion gear in meshing engagement with the third pinion gear and configured such that rotation of the fourth pinion gear in a first direction moves the fourth pinion gear into engagement with the catch and rotation of the fourth pinion gear in a second direction moves the fourth gear out of engagement with the catch.

8. The scanning system of claim 1 further comprising:
   a transparent platen;
   an input tray, wherein the document transport is configured to move the document from the input tray to and across the transparent platen; and
   an image sensor configured to sense images upon a stationary document and further configured to sense presence of the document or movement of the document by the transport prior to the document reaching the transparent platen.

9. The scanning system of claim 8 further comprising a flag configured to move in response to presence of a document along a media path, wherein the image sensor is configured to sense positioning of the flag.

10. The scanning system of claim 1 further comprising:
    a transparent platen configured to support the document; and
    a drive train extending from the motor to the document transport, the drive train including a first portion below the platen and a second portion carried by the lid, wherein the first portion moves between a second portion coupled state upon closing of the lid and a second portion decoupled state upon opening of the lid.

11. The scanning system of claim 1, wherein the document transport includes a pick tire configured to pick a sheet from a stack of sheets.

12. A method comprising:
    moving a carriage relative to a first stationary document with a motor to move a sensing area across the document; and
    picking a second document from a stack upon a lid using torque supplied by the motor, wherein the torque is supplied by the motor across a drive train, the drive train including a first portion below the lid and a second portion carried by the lid, wherein the first portion moves between a second portion coupled state upon closing of the lid and a second portion decoupled state upon opening of the lid.

13. The method of claim 12 further comprising moving an entirety of the second document across the sensing area using torque supplied by the motor.

14. The method of claim 12 further comprising sensing positioning of the second document being moved using the sensing area.

15. The method of claim 12 further comprising driving a pinion gear along a rack gear with the motor to move the carriage relative to the first stationary document.

16. A scanning system comprising:
    a transparent platen;
    an input tray;
    a first sensing area configured to be moved across a document; and a document transport configured to move the document from the input tray to and across the first sensing area, wherein the sensing area is configured to sense presence of the document or movement of the document by the document transport prior to the document reaching the transparent platen and wherein one or more operating states of the system are actuated in response to the sensed movement.

17. The scanning system of claim 16, wherein the document transport is configured to pick the document from a stack.

18. The scanning system of claim 16 further comprising:
a pivotable lid carrying the document transport, the pivotable lid comprising the input tray and an output tray proximate the document transport; and
a motor configured to selectively move the first sensing area across the document or to drive the document transport to move the document across the first sensing area.

19. The scanning system of claim 16 further comprising a flag configured to move in response to presence of a document along a media path, wherein the image sensor is configured to sense positioning of the flag.

20. The scanning system of claim 16, wherein the sensing area is configured to sense presence of the document while the document is in the input tray.

21. A scanning system comprising:
a carriage movable to reposition a sensing area;
a document transport configured to move a document relative to the sensing area;
a motor operably coupled to the carriage and the document transport so as to selectively move an entirety of the document across the sensing area while the carriage remains stationary or move the carriage to move the sensing area;
a transparent platen configured to support the document;
a lid carrying the document transport; and
a drive train extending from the motor to the document transport, the drive train including a first portion below the platen and a second portion carried by the lid, wherein the first portion moves between a second portion coupled state upon closing of the lid and a second portion decoupled state upon opening of the lid.

* * * * *